United States Patent
Sakurada et al.

(10) Patent No.: US 8,988,855 B2
(45) Date of Patent: Mar. 24, 2015

(54) METHOD OF MANUFACTURING CERAMIC ELECTRONIC COMPONENT INCLUDING HEATING AN ELECTRODE LAYER TO FORM A CONDUCTIVE LAYER INCLUDING AN ALLOY PARTICLE

(75) Inventors: Kiyoyasu Sakurada, Nagaokakyo (JP);
Kota Zenzai, Nagaokakyo (JP);
Hisayoshi Omori, Nagaokakyo (JP);
Takashi Kanayama, Nagaokakyo (JP);
Shinji Otani, Nagaokakyo (JP); Naoki Shimizu, Nagaokakyo (JP); Seiji Katsuta, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 73 days.

(21) Appl. No.: 13/287,253

(22) Filed: Nov. 2, 2011

(65) Prior Publication Data
US 2013/0107420 A1    May 2, 2013

(30) Foreign Application Priority Data
Oct. 31, 2011 (JP) ................................. 2011-239103

(51) Int. Cl.
| | | |
|---|---|---|
| *H01G 4/228* | (2006.01) | |
| *H01G 4/008* | (2006.01) | |
| *H01G 4/06* | (2006.01) | |
| *H01G 4/232* | (2006.01) | |

(Continued)

(52) U.S. Cl.
CPC .............. *H01G 4/2325* (2013.01); *H01G 4/30* (2013.01); *H01G 4/12* (2013.01)
USPC ..................... 361/306.3; 361/305; 361/321.2

(58) Field of Classification Search
CPC ......... H01G 4/2325; H01G 4/30; H01G 4/12; H01G 4/232
USPC ...................... 361/321.4, 321.3, 321.2, 306.3
See application file for complete search history.

(56) References Cited

U.S. PATENT DOCUMENTS 4,806,159 A  *  2/1989  De Keyser et al. .......... 106/1.11
5,128,827 A  *  7/1992  Yokotani et al. .............. 361/309

(Continued)

FOREIGN PATENT DOCUMENTS

EP          777242 A2  *  6/1997
JP          3-94409 A       4/1991

(Continued)

OTHER PUBLICATIONS

Zenzai et al., "Ceramic Electronic Component and Manufacturing Method Thereof," U.S. Appl. No. 13/287,276, filed Nov. 2, 2011.

(Continued)

*Primary Examiner* — David M Sinclair
(74) *Attorney, Agent, or Firm* — Keating & Bennett, LLP (57) ABSTRACT

A ceramic electronic component includes a ceramic body and an outer electrode. The outer electrode is disposed on the ceramic body. The outer electrode includes a first conductive layer and a second conductive layer. The first conductive layer includes a resin, a first metal component, and a second metal component having a higher melting point than the first metal component. The second conductive layer is disposed on the first conductive layer. The second conductive layer is includes a plating film. An alloy particle containing the first metal component and the second metal component protrudes to the second conductive layer side from a surface of the first conductive layer.

7 Claims, 5 Drawing Sheets

(51) Int. Cl.
  *H01G 4/30* (2006.01)
  *H01G 4/12* (2006.01)

(56) References Cited

U.S. PATENT DOCUMENTS

2006/0044098 A1* 3/2006 Kimura et al. ............... 336/122
2009/0139754 A1* 6/2009 Ikarashi et al. .............. 174/257
2009/0190285 A1* 7/2009 Kusano et al. ............. 361/321.4

FOREIGN PATENT DOCUMENTS

| JP | 10-284342 A | 10/1998 |
|----|----|----|
| JP | 2003-133158 A | 5/2003 |
| JP | 2008-263011 A | 10/2008 |
| JP | 2008-263012 A | 10/2008 |
| JP | 2008-263013 A | 10/2008 |
| JP | 2009-170835 A | 7/2009 |
| JP | 2009-283744 A | 12/2009 |
| WO | 2004/053901 A1 | 6/2004 |

OTHER PUBLICATIONS

Zenzai et al., "Ceramic Electronic Component and Manufacturing Method Thereof," U.S. Appl. No. 13/287,255, filed Nov. 2, 2011.
Official Communication issued in corresponding Japanese Patent Application No. 2012-228684, mailed on Dec. 9, 2014.

* cited by examiner

METHOD OF MANUFACTURING CERAMIC ELECTRONIC COMPONENT INCLUDING HEATING AN ELECTRODE LAYER TO FORM A CONDUCTIVE LAYER INCLUDING AN ALLOY PARTICLE

BACKGROUND OF THE INVENTION

1. Field of the Invention

The present invention relates to a ceramic electronic component and a method for producing the ceramic electronic component.

2. Description of the Related Art

In recent years, ceramic electronic components such as monolithic ceramic capacitors have been used in harsher environments than compared with before.

Ceramic electronic components used for mobile devices such as cellular phones and portable music players are required to withstand drop impacts. Specifically, even if electronic components undergo drop impacts, it is necessary that they will not easily become detached from mount boards and that cracks will not easily form in electronic components.

Electronic components used for in-vehicle equipment such as ECUs are required to withstand the shock of a thermal cycle. Specifically, even if mount boards undergo deflection stress caused when the mount boards are subjected to thermal expansion and contraction due to a thermal cycle, it is necessary that cracks will not easily form in ceramic electronic components and solder for mounting.

To satisfy such requirements, it has been proposed that an outer electrode containing a resin be formed using a thermosetting conductive paste instead of a conventional firing conductive paste. For example, WO2004/053901 discloses a ceramic electronic component including an outer electrode having a first conductive layer and a second conductive layer. The first conductive layer is formed using a thermosetting conductive paste containing conductive particles with a high melting point, a metal powder with a melting point of 300° C. or lower, and a resin with a melting point of 300° C. or lower. The second conductive layer is formed on the first conductive layer and is composed of a plating film.

In the ceramic electronic component disclosed in WO2004/053901, there is a problem in that the adhesion between the first conductive layer and the second conductive layer is low, and thus the first conductive layer and the second conductive layer are easily detached from each other.

SUMMARY OF THE INVENTION

Preferred embodiments of the present invention provide a ceramic electronic component with high mechanical durability.

A ceramic electronic component according to a preferred embodiment of the present invention includes a ceramic body and an outer electrode. The outer electrode is disposed on the ceramic body. The outer electrode includes a first conductive layer and a second conductive layer. The first conductive layer contains a resin, a first metal component, and a second metal component having a higher melting point than the first metal component. The second conductive layer is disposed on the first conductive layer. The second conductive layer includes a plating film. An alloy particle containing the first metal component and the second metal component protrudes to the second conductive layer side from a surface of the first conductive layer.

In one aspect of the ceramic electronic component according to a preferred embodiment of the present invention, the first metal component is Sn and the second metal component is Ag.

In another aspect of the ceramic electronic component according to a preferred embodiment of the present invention, the alloy particle contains a Sn—Ag alloy.

In a method for producing a ceramic electronic component according to yet another preferred embodiment of the present invention, an electrode layer is formed on a surface of a ceramic body, the electrode layer containing a resin, a first metal filler that contains a first metal component, and a second metal filler that contains a second metal component having a higher melting point than the first metal component. A heating step of heating the electrode layer is performed to form a first conductive layer including an alloy particle that contains the first metal component and the second metal component and protrudes from a surface of the first conductive layer. A second conductive layer is formed on the first conductive layer by plating.

In one aspect of the method for producing a ceramic electronic component according to a preferred embodiment of the present invention, in the heating step, the electrode layer is heated to about 480° C. or higher in a non-oxidative atmosphere.

In another aspect of the method for producing a ceramic electronic component according to a preferred embodiment of the present invention, in the heating step, the electrode layer is heated to a temperature of lower than about 800° C.

In still another aspect of the method for producing a ceramic electronic component according to a preferred embodiment of the present invention, the first metal component is Sn and the second metal component is Ag.

According to various preferred embodiments of the present invention, a ceramic electronic component with high mechanical durability is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Examples of preferred embodiments of the present invention will now be described. Note that the preferred embodiments below are merely examples. The present invention is not limited to the preferred embodiments below.

In the drawings referred in the description of preferred embodiments, components having substantially the same function are denoted by the same reference numerals. The drawings referred in the description of the preferred embodiments are schematically described, and the size ratio of objects drawn in the drawings may be different from that of actual objects. The size ratio of objects may also be different between the drawings. The specific size ratio of objects should be judged by taking the following description into consideration.

Figure 1:
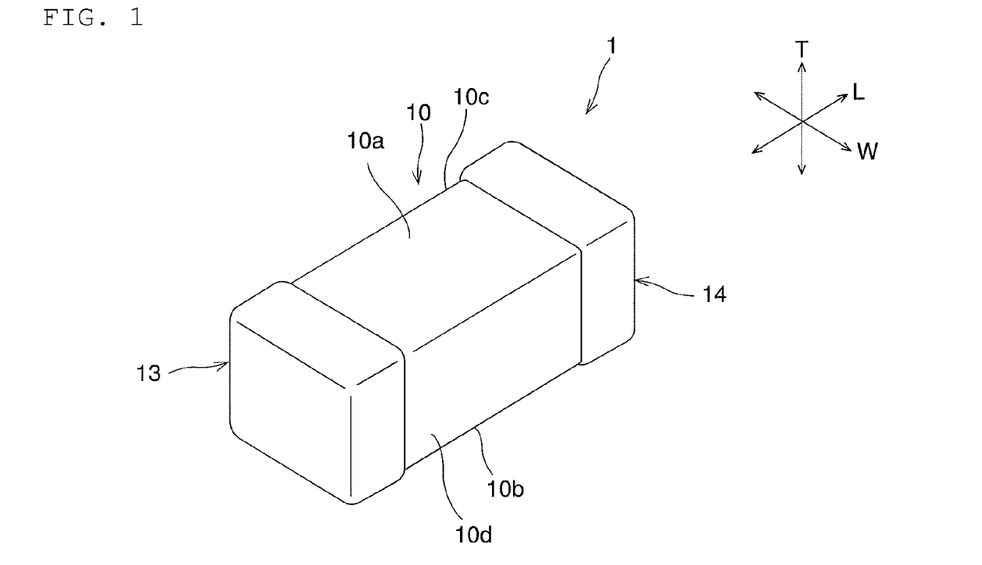
FIG. 1 is a schematic perspective view of a ceramic electronic component according to a preferred embodiment of the present invention.
Figure 2:
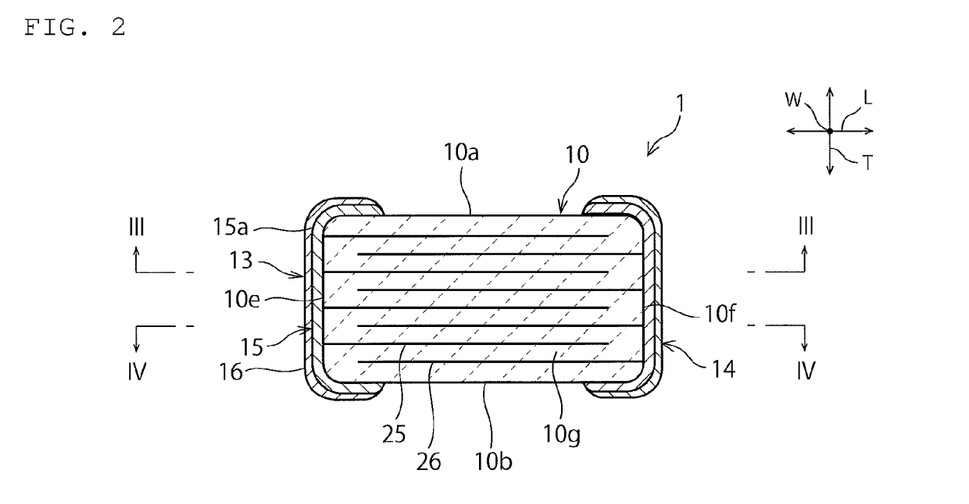
FIG. 2 is a schematic sectional view showing a cross section that extends in the length direction L and the thickness direction T of the ceramic electronic component according to a preferred embodiment of the present invention.
Figure 3:
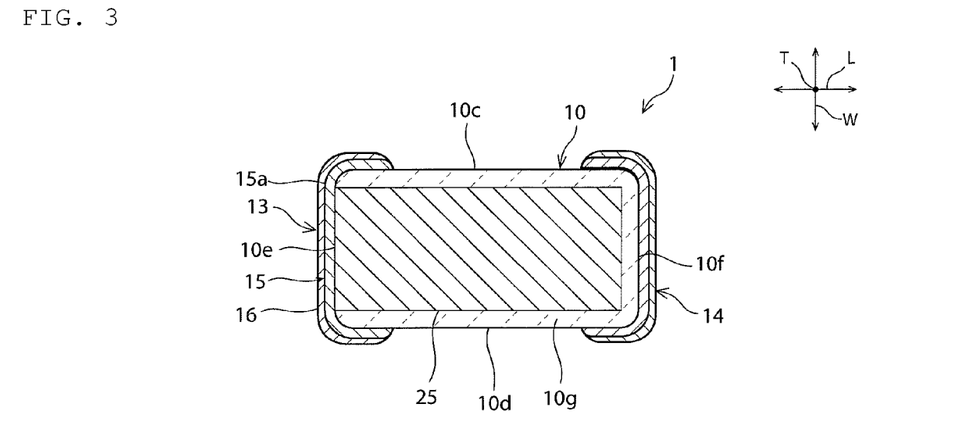
FIG. 3 is a schematic sectional view taken along line III-III of FIG. 2.
Figure 4:
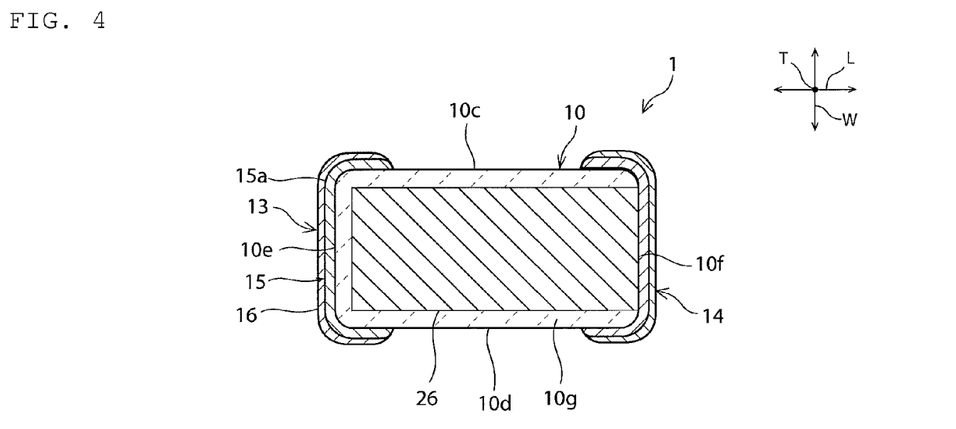
FIG. 4 is a schematic sectional view taken along line IV-IV of FIG. 2.

FIG. 1 is a schematic perspective view of a ceramic electronic component according to a preferred embodiment of the present invention. FIG. 2 is a schematic sectional view showing a cross section that extends in the length direction L and the thickness direction T of the ceramic electronic component according to the present preferred embodiment. FIG. 3 is a schematic sectional view taken along line III-III of FIG. 2. FIG. 4 is a schematic sectional view taken along line IV-IV of FIG. 2. First, the structure of a ceramic electronic component 1 according to the present preferred embodiment will be described with reference to FIGS. 1 to 4.

The ceramic electronic component 1 includes a ceramic body 10. The ceramic body 10 preferably has a rectangular parallelepiped shape, for example. The ceramic body 10 includes first and second principal surfaces 10a and 10b that extend in the length direction L and the width direction W, first and second side surfaces 10c and 10d that extend in the thickness direction T and the length direction L, and first and second end surfaces 10e and 10f that extend in the thickness direction T and the width direction W.

In preferred embodiments of the present invention, the "rectangular parallelepiped shape" includes a rectangular parallelepiped whose corners and ridge lines are rounded. That is, a "rectangular parallelepiped" component includes any component having first and second principal surfaces, first and second side surfaces, and first and second end surfaces. Furthermore, depressions and projections may be partially or entirely formed on the principal surfaces, side surfaces, and end surfaces.

The ceramic body 10 is composed of a suitable ceramic material. The type of ceramic material constituting the ceramic body 10 can be suitably selected in accordance with desired characteristics of the ceramic electronic component 1.

For example, when the ceramic electronic component 1 is a capacitor (monolithic ceramic capacitor), the ceramic body 10 can be formed of a dielectric ceramic material. Examples of the dielectric ceramic material include $BaTiO_3$, $CaTiO_3$, $SrTiO_3$, $CaZrO_3$, $MgTiO_3$, $MgTiO_3$—$CaTiO_3$, $TiO_2$ and $BaTiO_3$—$Nd_2O_3$—$TiO_2$.

For example, when the ceramic electronic component 1 is a piezoelectric component, the ceramic body 10 can be formed of a piezoelectric ceramic material. An example of the piezoelectric ceramic material is a PZT (lead zirconate titanate) ceramic material.

For example, when the ceramic electronic component 1 is a thermistor, the ceramic body 10 can be formed of a semiconductor ceramic material. An example of the semiconductor ceramic material is a spinel-type ceramic material.

For example, when the ceramic electronic component 1 is an inductor, the ceramic body 10 can be formed of a magnetic ceramic material. An example of the magnetic ceramic material is a ferrite ceramic material.

As shown in FIGS. 2 to 4, inside the ceramic body 10, a plurality of first and second inner electrodes 25 and 26 each having a substantially rectangular shape are alternately arranged at regular intervals in the thickness direction T. The first and second inner electrodes 25 and 26 are parallel or substantially parallel to the first and second principal surfaces 10a and 10b. In the thickness direction T, the first and second inner electrodes 25 and 26 face each other with a ceramic layer 10g therebetween. The thickness of the ceramic layer 10g is, for example, preferably about 0.5 µm to about 10 µm.

The end portions of the first and second inner electrodes 25 and 26 extend to the surface of the ceramic body 10. Specifically, the first inner electrode 25 is exposed on the first end surface 10e, and is not exposed on the first and second principal surfaces 10a and 10b, the second end surface 10f, and the first and second side surfaces 10c and 10d. The second inner electrode 26 is exposed on the second end surface 10f, and is not exposed on the first and second principal surfaces 10a and 10b, the first end surface 10e, and the first and second side surfaces 10c and 10d. Specifically, the end portions of the first and second inner electrodes 25 and 26 are slightly depressed from the first and second end surfaces 10e and 10f, respectively.

The first and second inner electrodes 25 and 26 can be composed of a suitable conductive material, e.g., a metal such as Ni, Cu, Ag, Pd, or Au or an alloy containing at least one of the foregoing metals, such as a Ag—Pd alloy.

The thicknesses of the first and second inner electrodes 25 and 26 are, for example, each preferably about 0.2 µm to about 2.0 µm.

First and second outer electrodes 13 and 14 are disposed on the surface of the ceramic body 10. Specifically, the first outer electrode 13 is disposed so as to cover the first end surface 10e on which the first inner electrode 25 is exposed. The first outer electrode 13 is disposed so as to reach the first and second principal surfaces 10a and 10b and the first and second side surfaces 10c and 10d. The first outer electrode 13 is electrically connected to the first inner electrode 25.

The second outer electrode 14 is disposed so as to cover the second end surface 10f on which the second inner electrode 26 is exposed. The second outer electrode 14 is disposed so as to reach the first and second principal surfaces 10a and 10b and the first and second side surfaces 10c and 10d. The second outer electrode 14 is electrically connected to the second inner electrode 26.

The first and second outer electrodes 13 and 14 each include a first conductive layer 15 and a second conductive layer 16. The first conductive layer 15 is disposed directly on the surface of the ceramic body 10. Specifically, the first conductive layer 15 is disposed so as to cover the first end surface 10e or the second end surface 10f and reach the first and second principal surfaces 10a and 10b and the first and second side surfaces 10c and 10d. Herein, the first conductive layer 15 may be disposed only on the first end surface 10e or the second end surface 10f.

The thickness of the first conductive layer 15 is, for example, preferably about 5.0 µm to about 70.0 µm.

The second conductive layer 16 is disposed on the first conductive layer 15. The first conductive layer 15 is substantially covered with the second conductive layer 16. The second conductive layer 16 includes a plating film. The second conductive layer 16 may include a single plating film or a laminated body of multiple plating films. Specifically, the second conductive layer 16 is disposed on the first conductive layer 15 and may be composed of a laminated body of a Ni plating layer that also serves as a barrier layer and a plating layer that is disposed on the Ni plating layer and contains Sn or Au, which has good wettability. The thickness of each of the plating layers constituting the second conductive layer 16 is, for example, preferably about 1 μm to about 15 μm.

The first conductive layer 15 contains a first metal component, a second metal component, and a resin. Since the first conductive layer 15 contains a resin, it is more flexible than a conductive layer composed of, for example, a plating film or a fired product of conductive paste. Therefore, even if the ceramic electronic component 1 is subjected to physical impact or a shock caused by a thermal cycle, the first conductive layer 15 functions as a shock absorbing layer. Thus, the ceramic electronic component 1 is not easily damaged and solder used to mount the ceramic electronic component 1 is also not easily damaged.

Preferred examples of the resin added to the first conductive layer 15 include thermosetting resins such as an epoxy resin and a phenolic resin.

The content of the resin in the first conductive layer 15 after curing is preferably about 46% to about 77% by volume, for example.

The melting point of the first metal component is relatively low and the melting point of the second metal component is relatively high. The melting point of the first metal component is, for example, preferably about 550° C. or lower and more preferably about 180° C. to about 340° C. The melting point of the second metal component is, for example, preferably about 850° C. to about 1050° C.

The first metal component is preferably composed of, for example, Sn, In, or Bi or an alloy containing at least one of the foregoing metals. In particular, the first metal component is more preferably composed of Sn or an alloy containing Sn. Examples of the alloy containing Sn include Sn—Ag, Sn—Bi, and Sn—Ag—Cu.

The content of the first metal component in the first conductive layer 15 after curing is preferably about 8% to about 18% by volume, for example.

The second metal component is preferably composed of, for example, a metal such as Ag, Pd, Pt, or Au or an alloy containing at least one of the foregoing metals. In particular, the second metal component is more preferably composed of Ag or a Ag alloy such as a Ag—Pd alloy.

The content of the second metal component in the first conductive layer 15 is preferably about 19% to about 25% by volume, for example.

The first conductive layer 15 has alloy particles that protrude to the second conductive layer 16 side from a surface 15a of the first conductive layer 15 on the second conductive layer 16 side. The alloy particles contain the first metal component and the second metal component. In the case where the first metal component is Sn and the second metal component is Ag, the alloy particles may contain a Sn—Ag alloy.

The average particle size of the alloy particles is not particularly limited and can be, for example, about 0.5 μm to about 10 μm.

The specific gravity of the alloy particles may be about 7.3 to about 10.5, for example.

The alloy particles may have a spherical shape or a shape other than a spherical shape.

An example of a method for producing the ceramic electronic component 1 will now be described.

First, a ceramic body 10 including first and second inner electrodes 25 and 26 is prepared. Specifically, a ceramic paste containing a ceramic powder is applied in a sheet-shaped configuration by screen printing or other suitable process and then dried to produce a ceramic green sheet. Subsequently, a conductive paste for forming inner electrodes is applied on the ceramic green sheet in a predetermined pattern by screen printing or other suitable process, for example. Thus, a ceramic green sheet on which a conductive pattern for forming inner electrodes has been formed and a ceramic green sheet on which a conductive pattern for forming inner electrodes is not formed are prepared. Note that a publicly known binder or solvent may be contained in the ceramic paste and the conductive paste for forming inner electrodes.

Next, a predetermined number of ceramic green sheets on which a conductive pattern for forming inner electrodes is not formed are stacked on top of each other. Ceramic green sheets on which a conductive pattern for forming inner electrodes has been formed are stacked thereon successively. A predetermined number of ceramic green sheets on which a conductive pattern for forming inner electrodes is not formed are further stacked thereon. As a result, a mother stack is produced. The mother stack may be optionally subjected to pressing in the stacking direction by isostatic pressing or other suitable process, for example.

The mother stack is then cut into a plurality of green ceramic bodies each having a predetermined shape and size. The green ceramic bodies may be subjected to barrel polishing to round the ridge lines and corners thereof.

Next, by firing each of the green ceramic bodies, a ceramic body 10 is completed that includes first and second inner electrodes 25 and 26 disposed inside the ceramic body 10 and in which the end portions of the first and second inner electrodes 25 and 26 are led to the first and second end surfaces 10e and 10f, respectively. The firing temperature of the green ceramic bodies can be suitably set in accordance with the ceramic material and conductive material used. The firing temperature of the green ceramic bodies can be, for example, about 900° C. to about 1300° C.

A paste for forming outer electrodes is then prepared that contains a resin 17c such as a thermosetting resin, a first metal filler 17a containing a first metal component, and a second metal filler 17b containing a second metal component having a higher melting point than the first metal component.

In this paste, the content of the first metal filler 17a relative to the total weight of the first metal filler 17a, the second metal filler 17b, and the resin 17c is preferably about 20% to about 40% by weight and more preferably about 22.0% to about 37.2% by weight, for example. If the content of the first metal filler 17a is excessively low, a metal layer is sometimes not sufficiently formed. If the content of the first metal filler 17a is excessively high, the amount of first metal filler 17a that does not react with the second metal filler 17b and is left in outer electrodes 13 and 14 increases. As a result, the outer electrodes 13 and 14 may be deformed, for example, due to heat applied during reflowing.

The shape of the first metal filler 17a is not particularly limited. The first metal filler 17a may have a spherical shape, a flat shape, or other suitable shape, for example.

The average particle size of the first metal filler 17a is not particularly limited and may be, for example, about 1.0 μm to about 10 μm.

In this paste, the content of the second metal filler 17b relative to the total weight of the first metal filler 17a, the second metal filler 17b, and the resin 17c is preferably about 30% to about 70% by weight and more preferably about 41.2% to about 64% by weight, for example. If the content of the second metal filler 17b is excessively low, the conductivity of the outer electrodes 13 and 14 decreases and the equivalent series resistance (ESR) of the ceramic electronic component 1 may increase. If the content of the second metal filler 17b is excessively high, the content of the resin 17c in the outer electrodes 13 and 14 excessively decreases. As a result, the stress relaxation effect of the outer electrodes 13 and 14 may excessively degrade.

The shape of the second metal filler 17b is not particularly limited. The second metal filler 17b may have a spherical shape, a flat shape, or other suitable shape, for example.

The average particle size of the second metal filler 17b is not particularly limited and may be, for example, about 0.5 µm to about 5.0 µm.

In this paste, the content of the resin 17c relative to the total weight of the first metal filler 17a, the second metal filler 17b, and the resin 17c is preferably about 5% to about 40% by weight and more preferably about 9.8% to about 31.5% by weight, for example. If the content of the resin 17c is excessively low, the stress relaxation effect of the outer electrodes 13 and 14 excessively degrade and thus impacts generated when stress is applied from the outside are sometimes not sufficiently absorbed by the outer electrodes 13 and 14. If the content of the resin 17c is excessively high, the conductivity of the outer electrodes 13 and 14 decreases and the equivalent series resistance (ESR) of the ceramic electronic component 1 may increase.

Figure 5:
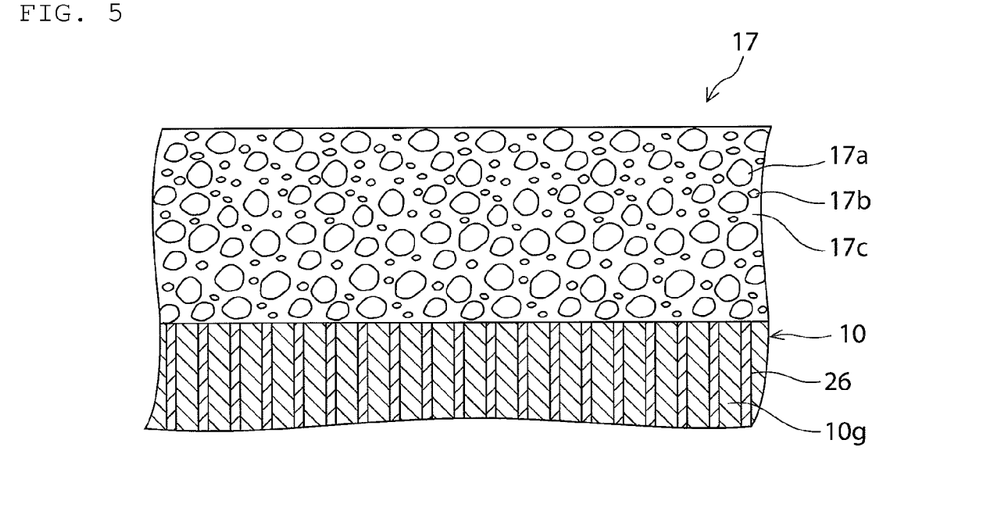
FIG. 5 is a schematic sectional view for describing the production process of the ceramic electronic component according to a preferred embodiment of the present invention.

As shown in FIG. 5, an electrode layer 17 is then formed by applying the above-described paste onto the surface of the ceramic body 10. The paste can be applied by various printing methods or a dipping method.

Next, the electrode layer 17 is heated. The heating temperature of the electrode layer 17 is preferably higher than or equal to a temperature (a temperature range in which the diffusion of the first metal component to the outside of the electrode layer 17 is facilitated) at which the crystalline state of an alloy of the first metal component and the second metal component changes thermodynamically. The heating temperature of the electrode layer 17 is, for example, preferably about 480° C. or higher. The electrode layer 17 is preferably heated in a non-oxidative atmosphere, e.g., a reducing atmosphere or a neutral atmosphere such as a nitrogen gas atmosphere. The electrode layer 17 is preferably heated in an atmosphere whose oxygen concentration is about 100 ppm or less. By heating the electrode layer 17 to such a high temperature, the alloy particles containing the first and second metal components can be caused to protrude to the second conductive layer 16 side from the surface 15a of the first conductive layer 15.

If the heating temperature of the electrode layer 17 is excessively high, the first conductive layer 15 containing the resin 17c is sometimes not suitably formed. Thus, the heating temperature of the electrode layer 17 is preferably lower than about 800° C. and more preferably about 650° C. or lower.

Finally, by forming a second conductive layer 16 including a plating film by a plating method or other suitable method, a ceramic electronic component 1 can be completed. The second conductive layer 16 is more preferably formed by an electrolytic plating method.

As described above, since the outer electrodes 13 and 14 contain the resin 17c in this preferred embodiment, the ceramic electronic component 1 is excellent in terms of impact resistance and resistance to a thermal cycle. In addition, the alloy particles containing the first and second metal components protrude to the second conductive layer 16 side from the surface 15a of the first conductive layer 15. Since the protruding alloy particles properly function as a growth nucleus for plating, the adhesion between the first conductive layer 15 and the second conductive layer 16 is significantly increased. Therefore, a ceramic electronic component 1 having high mechanical durability in which the first conductive layer 15 and the second conductive layer 16 are not easily detached from each other can be provided. It is also expected that the adhesion between the first conductive layer 15 and the second conductive layer 16 is increased due to the anchor effect caused by the alloy particles.

It is also expected that the first metal component and the second metal component diffuse into the ceramic body 10 and thus cracks formed in the ceramic body 10 are repaired, whereby the rigidity and moisture resistance of the ceramic body 10 are further improved.

Preferred embodiments of the present invention will now be further described in detail based on specific non-limiting experimental examples. However, the present invention is not limited by the experimental examples below and may be modified without departing from the scope of the present invention.

Figure 6:
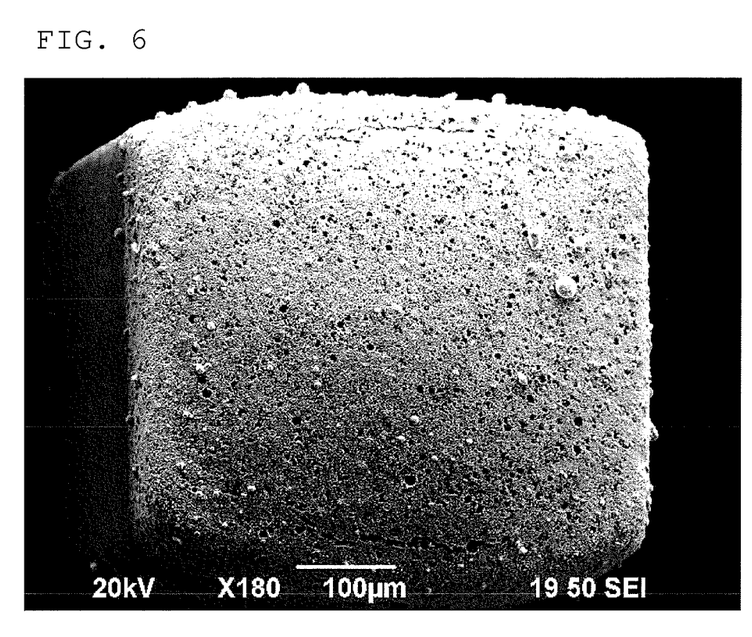
FIG. 6 is an electron micrograph of a first conductive layer in Experimental Example 5.

Ceramic electronic components each having the same structure as that of the ceramic electronic component 1 according to the above-described preferred embodiments were prepared under the conditions below. After the first conductive layer 15 was formed, the central region of the first conductive layer 15 was observed with a scanning electron microscope (acceleration voltage: 20 kV, magnification: 180×) to confirm the presence or absence of the alloy particles protruding from the first conductive layer 15. FIG. 6 is an electron micrograph of the first conductive layer in Experimental Example 5.

Subsequently, the peel strength between the first conductive layer 15 and the second conductive layer 16 was measured under the conditions below. Table 1 shows the results.

Size of ceramic body 10: 1.0 mm×0.5 mm×0.5 mm

Ceramic material: $BaTiO_3$

Thickness of ceramic layer 10g: 1.90 µm

Material of inner electrodes 25 and 26: Ni

Thickness of inner electrodes 25 and 26: 0.61 µm

Number of inner electrodes 25 and 26: 156

Distance from outermost inner electrode to principal surface (thickness of outer layer on one side): 60 µm Resin 17c: thermosetting epoxy resin Content of first metal filler relative to the total amount of first metal filler, second metal filler, and resin 17c: 25.6% by weight Content of second metal filler relative to the total amount of first metal filler, second metal filler, and resin 17c: 60% by weight Content of resin 17c relative to the total amount of first metal filler, second metal filler, and resin 17c: 14.4% by weight Heat treatment atmosphere: nitrogen gas atmosphere Heat treatment time: 18 minutes Heat treatment temperature: shown in Table 1

Second conductive layer 16: laminated body of Ni plating layer and Sn plating layer (Sn plating layer forms an outermost layer)

Figure 7:
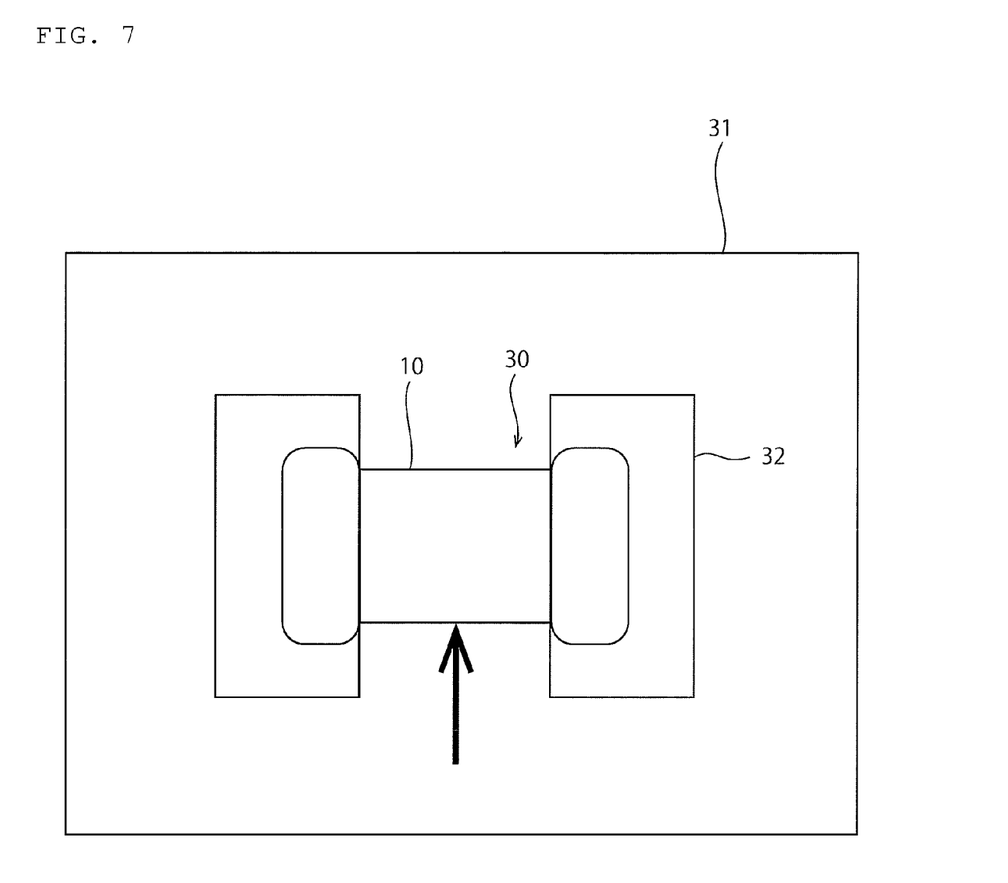
FIG. 7 is a schematic plan view for describing the measurement method of peel strength.

As shown in FIG. 7, each of samples 30 was placed on a land 32 of a glass-epoxy substrate 31 and subjected to soldering. The central portion on the side surface of the ceramic body 10 of the sample 30 was pressed with a pressure jig in the width direction while a load was imposed at a load increasing rate of 0.5 mm/s. A load obtained when the second conductive layer 16 was peeled from the first conductive layer 15 was defined as peel strength.

TABLE 1

| | Heat treatment temperature | Protruding alloy particles | Peel strength |
|---|---|---|---|
| Experimental Example 1 | 450° C. | absence | 14.5N |
| Experimental Example 2 | 480° C. | presence | 31.0N |

TABLE 1-continued

| | Heat treatment temperature | Protruding alloy particles | Peel strength |
|---|---|---|---|
| Experimental Example 3 | 500° C. | presence | 30.5N |
| Experimental Example 4 | 525° C. | presence | 29.0N |
| Experimental Example 5 | 550° C. | presence | 27.5N |
| Experimental Example 6 | 600° C. | presence | 25.0N |

As is clear from the results shown in Table 1, the peel strength between the first conductive layer 15 and the second conductive layer 16 can be increased by providing alloy particles that protrude from the first conductive layer 15. In addition to the Experimental Examples shown in Table 1, an experiment was performed at a heat treatment temperature of about 800° C. However, in this experiment, the resin 17c was scattered and thus the outer electrodes substantially did not contain the resin 17c.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method for producing a ceramic electronic component, the method comprising:
a step of forming an electrode layer on a surface of a ceramic body, the electrode layer including a resin, a first metal filler that contains a first metal component, and a second metal filler that contains a second metal component having a higher melting point than the first metal component;
a step of heating the electrode layer in an atmosphere whose oxygen concentration is about 100 ppm or less to form a first conductive layer including an alloy particle that contains the first metal component and the second metal component and protrudes from a surface of the first conductive layer; and
a step of forming a second conductive layer on the first conductive layer by plating; wherein
a content of the resin in the first conductive layer after heating is about 46% by volume to about 77% by volume.

2. The method for producing a ceramic electronic component according to claim 1, wherein, in the step of heating, the electrode layer is heated to about 480° C. or higher in a non-oxidative atmosphere.

3. The method for producing a ceramic electronic component according to claim 2, wherein, in the step of heating, the electrode layer is heated to a temperature of lower than about 800° C.

4. The method for producing a ceramic electronic component according to claim 2, wherein the first metal component is Sn and the second metal component is Ag.

5. A ceramic electronic component comprising:
a ceramic body including first and second end surfaces, first and second principal surfaces, and first and second side surfaces; and
an outer electrode disposed on the ceramic body so as to cover one of the first and second end surfaces and extend onto the first and second principal surfaces, and the first and second side surfaces; wherein
the outer electrode includes:
a first conductive layer including a resin, a first metal component, and a second metal component having a higher melting point than the first metal component; and
a second conductive layer that is disposed on the first conductive layer and includes a plating film; and
an alloy particle including the first metal component and the second metal component protrudes to the second conductive layer side from portions of the first conductive layer disposed on the one of the first and second end surfaces, the first and second principal surfaces, and the first and second side surfaces of the ceramic body; and
a content of the resin in the first conductive layer is about 46% by volume to about 77% by volume.

6. The ceramic electronic component according to claim 5, wherein the first metal component is Sn and the second metal component is Ag.

7. The ceramic electronic component according to claim 6, wherein the alloy particle contains a Sn—Ag alloy.

* * * * *